Aug. 28, 1962  R. A. PETERSON ET AL  3,051,897
ANALYSIS SYSTEM

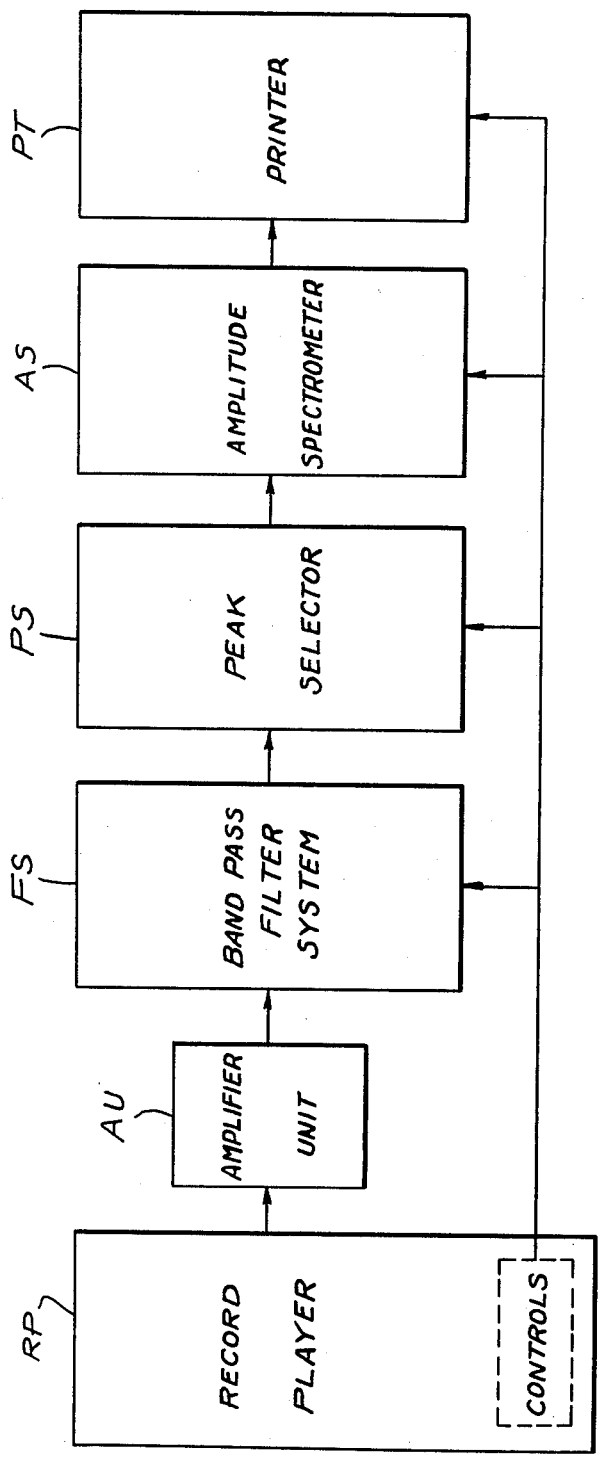

Filed Feb. 11, 1957  7 Sheets-Sheet 2

| 0 | – | 140 | – | – | 36 | 2020 | – | 9147 | – | – |
|---|---|---|---|---|---|---|---|---|---|---|
| 0 | – | 15 | – | 16 | 1290 | 620 | – | 75 | – | – |
| 0 | – | – | 24 | – | 104 | 209 | 319 | 144 | – | – |
| 0 | – | 1 | 312 | – | – | – | 5126 | 1872 | 1914 | – |
| 0 | 7 | 12 | 18 | 5 | – | – | 222 | 123 | 20733 | – |
| 0 | 82 | 5 | – | 31 | – | – | – | – | 412 | 4160 |
| 0 | 1 | 2 | 3 | 4 | 5 | 6 | 7 | 8 | 9 | 10 |

FIG. 2.  RC

| 3A | 3B | 3C | 3D |
|---|---|---|---|

FIG. 3.

INVENTORS.
RAYMOND A. PETERSON
FRANK B. COKER
BY
ATTORNEY

INVENTORS.
RAYMOND A. PETERSON
FRANK B. COKER
BY
ATTORNEY

Aug. 28, 1962    R. A. PETERSON ET AL    3,051,897
ANALYSIS SYSTEM
Filed Feb. 11, 1957    7 Sheets-Sheet 7

INVENTORS.
RAYMOND A. PETERSON
BY FRANK B. COKER

Reed C. Lawlor
ATTORNEY

# United States Patent Office 3,051,897
Patented Aug. 28, 1962

3,051,897
ANALYSIS SYSTEM
Raymond A. Peterson, Altadena, and Frank B. Coker, Pasadena, Calif., assignors, by mesne assignments, to United Electrodynamics, Inc., Pasadena, Calif., a corporation of California
Filed Feb. 11, 1957, Ser. No. 639,414
19 Claims. (Cl. 324—77)

This invention relates to the statistical analysis of variable phenomena and more particularly to an improved system for analyzing a time-varying forcing function or vibration wave, especially one that is aperiodic.

Mechanical devices of all sorts are usually designed to withstand fluctuating stresses produced in such devices by virtue of an aperiodic variable time-varying force applied thereto from some external source or otherwise occurring in such devices when in use. For example, parts of airplanes and guided missiles must be designed to withstand high acceleration forces of a variable character. In the designing of such devices, specimens or prototypes of the devices are frequently subjected to vibratory tests that provide an index of how the device will respond to a typical force function applied to it when in actual use. In planning and establishing a test program it is very desirable to have information respecting the character of the force function to which the device may be subjected in use.

Furthermore, when devices have failed in use either as a rule or in a large proportion of cases, it is very desirable to study the types of forces to which the devices have been subjected. Such studies enable an engineer to ascertain the nature of that part of the force responsible for the damage to the device. They also help him in the redesign of such device to reduce future failures.

In the past, it has been common to analyze a force function by the methods of Fourier, both to determine the character of the force function and also to facilitate synthesis of the force function for use in testing devices. Such Fourier methods are of two types. One is more frequently known by the method of Fourier analysis. This method is applicable particularly to the analysis of periodic force functions. The other Fourier method involves the use of Fourier integrals. The latter methods are particularly applicable to the analysis of aperiodic force functions.

To avoid the complexities of Fourier analysis, other types of systems have been devised. Some of the systems that have been developed for the analysis of force functions are described in the following articles:

(1) "Analog Equipment for Processing Randomly Fluctuating Data," by Francis B. Smith. See: Aeronautical Engineering Review, May 1955, pp. 113-119.

(2) "A Re-Evaluation of Vibration Testing Techniques," by Joseph Kaufman. See: Electrical Manufacturing, November 1955, pp. 132-138.

In the systems described in the above-mentioned articles by Messrs. Smith and Kaufman, a measure is obtained of the relative amplitudes of various frequency components of the aperiodic forcing functions, or else the average value of the amplitudes of such components. Stated another way, in those systems the average power per cycle of band width is obtained at different frequencies. By plotting those averages as a function of frequency, a curve is obtained which is known as a power density spectrum. Once such density spectra are obtained, they may be utilized to operate testing equipment in order to test various devices that are expected to come under the influence of such a forcing function. However, such tests are not entirely satisfactory because all that is learned from such tests is how the devices respond to forces in different frequency ranges that have an average amplitude equal to that of the forcing function in that frequency range. For this reason these prior art methods are not entirely satisfactory.

To illustrate, in testing a device, it may be desirable to ascertain whether its fatigue characteristics are sufficient to enable it to survive being subjected to a specific forcing function for a predetermined time interval. For example, it may be desirable to ascertain whether a particular mechanical part being carried by a guided missile which has a predetermined short-time life is likely to break or otherwise become disabled under the influence of aperiodic forces to which it is likely to be subjected during the flight of the missile. Clearly, in such a case testing the particular mechanical elements by means of average forces is not sufficient. One reason for this is that the fatigue characteristic of a mechanical part is a non-linear characteristic of the stress to which it is subjected.

In a like manner, if it is desired to test a relay to determine whether its contacts will remain in some predetermined condition, either open or closed, for a predetermined time during the flight of a guided missile, a mere test of the relay by means of average forces will fail to provide an indication of whether the relay will remain in that condition as required. The reason for this is that the required condition of the relay may be altered from an open to a closed condition or vice versa when the amplitude of the force applied to the relay exceeds some predetermined limit for a predetermined time.

Both in the case of the mechanical part and in the case of a relay, it is desirable to ascertain what proportion of the time the forcing function has a peak amplitude lying within a dangerous range. Furthermore, it is not always sufficient to have such information for the forcing function itself, but it is also desirable to obtain such information with respect to particular components of the forcing function. The reason for this is that the mechanical part itself, or the relay itself, may have a non-uniform frequency response characteristic. For example, it may resonate at a particular frequency.

In accordance with this invention, an improved system is provided for the statistical analysis of a forcing function. This method provides data that is more suitable than those heretofore employed to determine the effects of such forcing functions on mechanical devices which may become subjected to such forcing functions when in use. In the best mode of practicing our invention now known to us, a record is made of a forcing function. In such a record, the instantaneous amplitude of the forcing function is recorded as a function of time, and the record is then analyzed to determine the relative frequency of occurrence of peak amplitudes of pulse forces in various frequency bands of the force function wave. More particularly, a record is made of how the instantaneous value of the force function varies as a function of time. The record made for this purpose is of the phonographic or reproducible type. This record is then played in a phonographic or other reproducing machine in order to generate an electrical wave that corresponds to the recorded force function. The electrical wave so produced is then passed through a band pass filter, thus filtering out components of the electrical wave lying outside a predetermined frequency band and transmitting through the filter only components that lie within that band. Thus an electrical wave is reproduced which represents the part of the force function that lies within the predetermined frequency band. This filtered wave is then analyzed to determine what proportion of the wave pulses have amplitudes lying within different amplitude ranges. The filtering and analysis process is then repeated a number of times utilizing different band pass filters. In this way a set of data is obtained which represents the pulse-amplitude distribution frequency for a series of frequency bands. When such data are plotted in a cross-sectional arrangement in which abscissae represent successive frequency bands and in which ordinates represent numbers of pulses in different amplitude ranges, the resultant plot is known as a pulse-amplitude-frequency versus frequency band histogram.

The nature of our invention will be more fully understood by reference to the following description and the accompanying drawings in which one system embodying the invention is illustrated. It will be understood, though, that our invention may also be practiced in other ways and embodied in other forms within the scope of the appended claims.

In the drawings, wherein like reference numerals in the different figures represent like parts:

FIGURE 1 is a block diagram of a wave analyzer embodying features of the present invention;

FIG. 2 represents a histogram of the type produced in accordance with this invention;

Figure 3A:
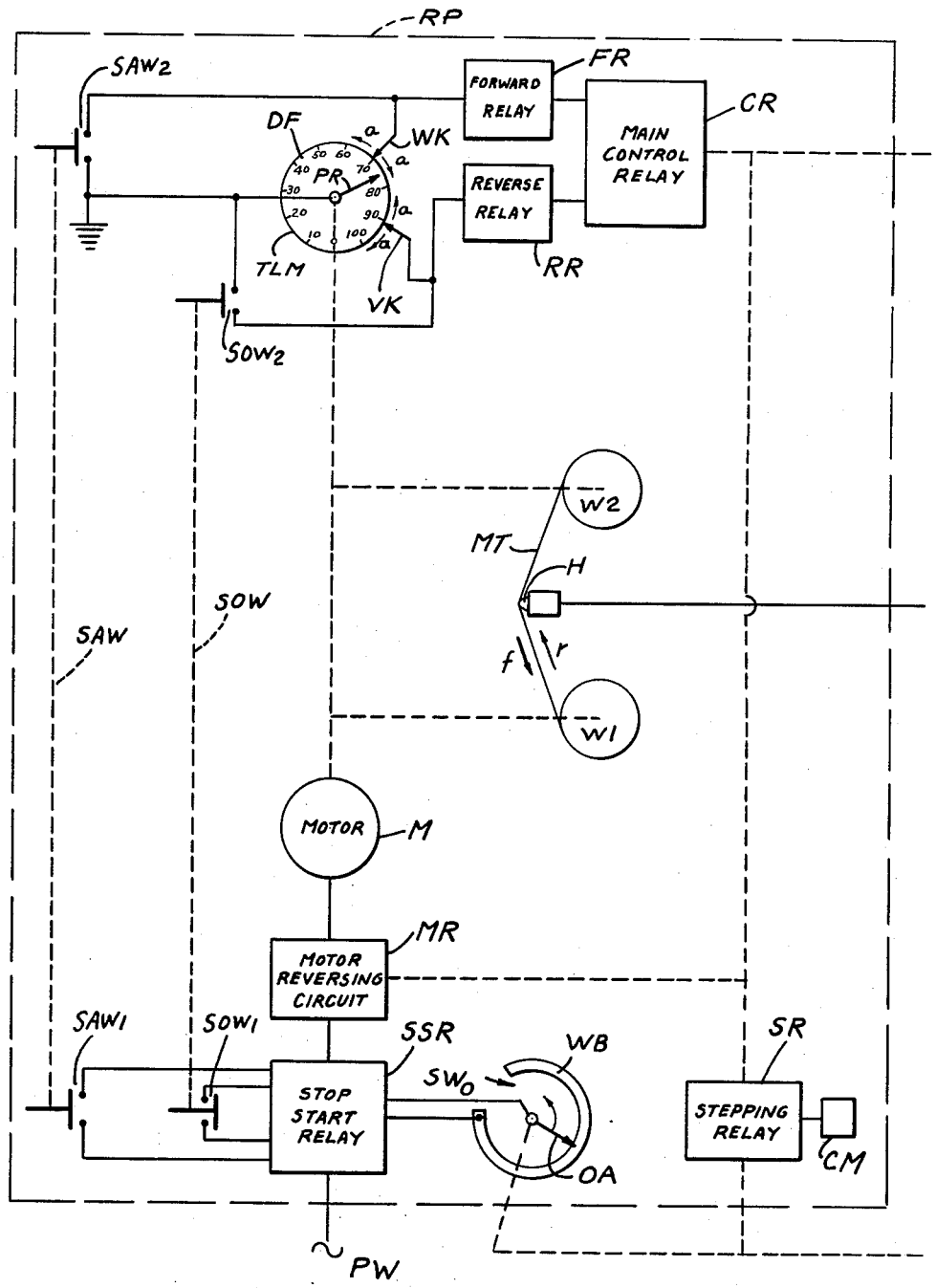
Figure 3B:
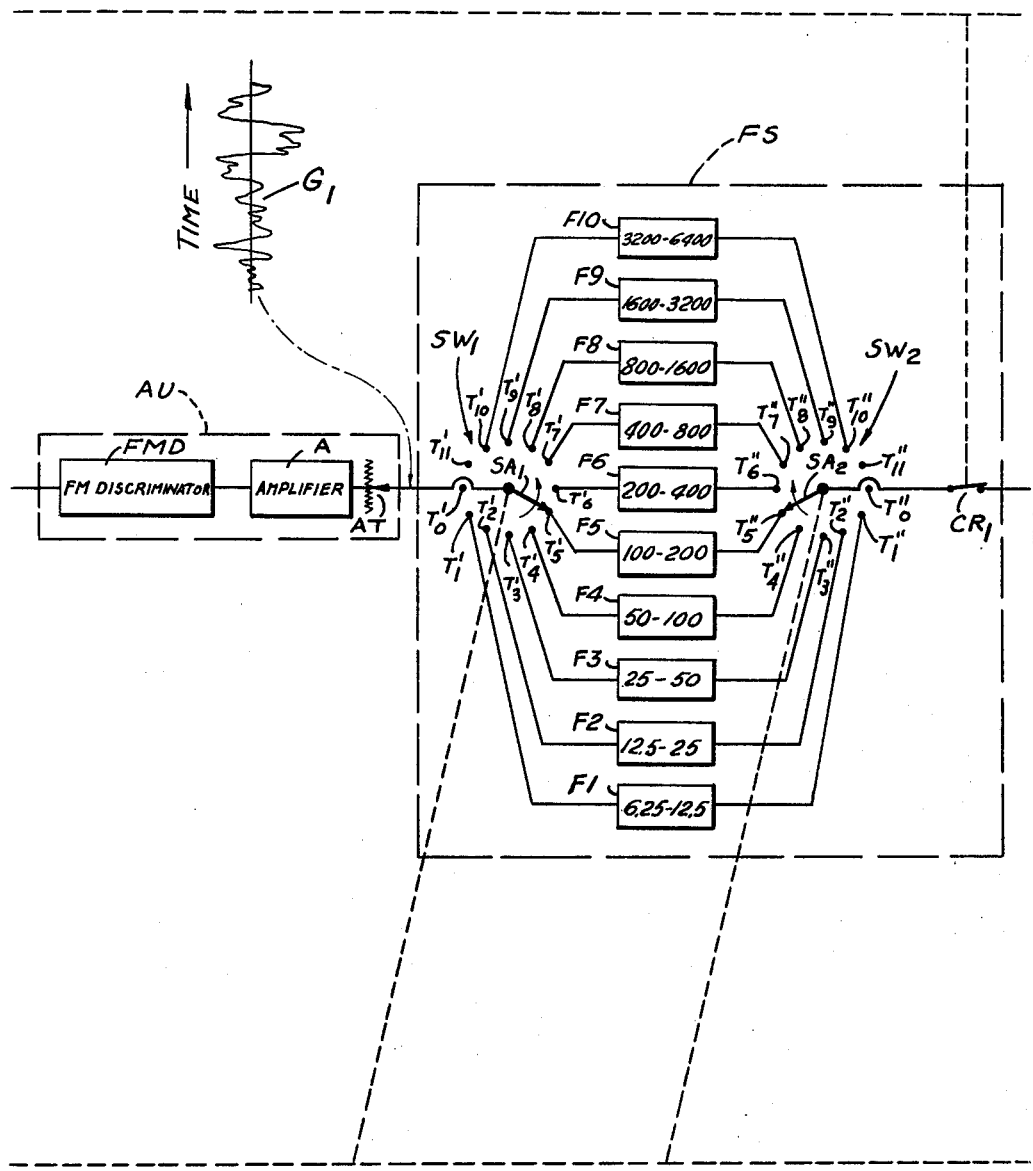
Figure 3C:
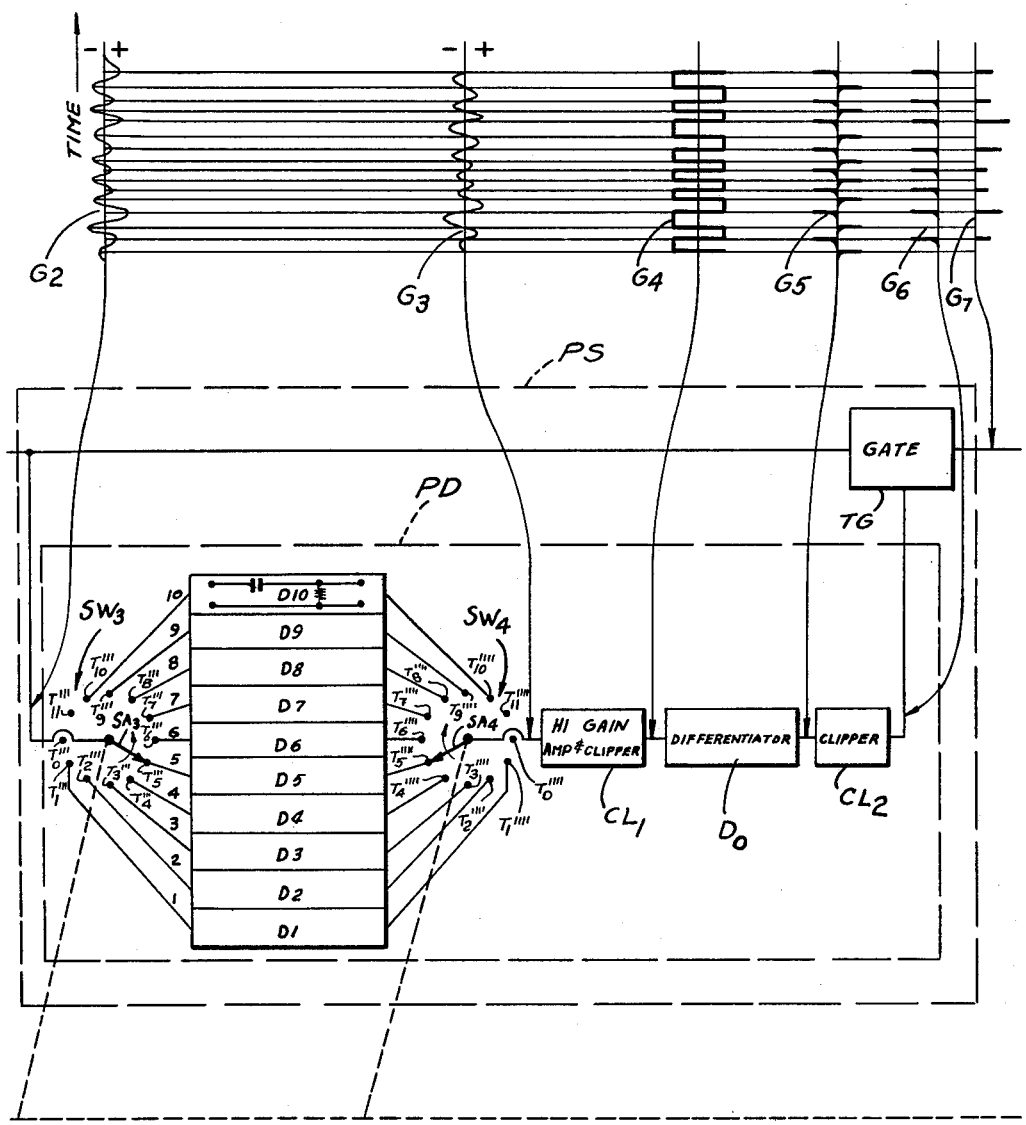
Figures 3D, 4:
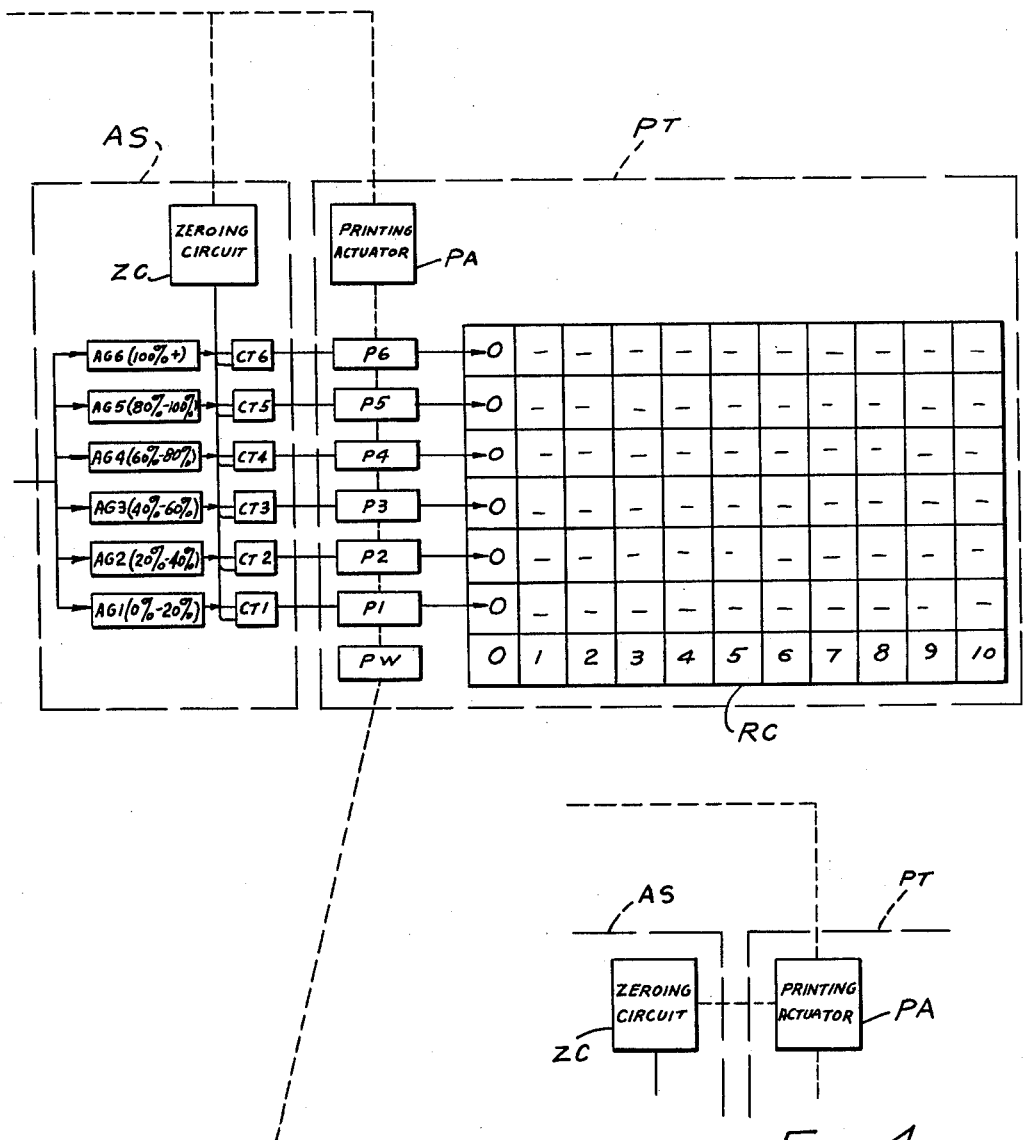
Figure 5:
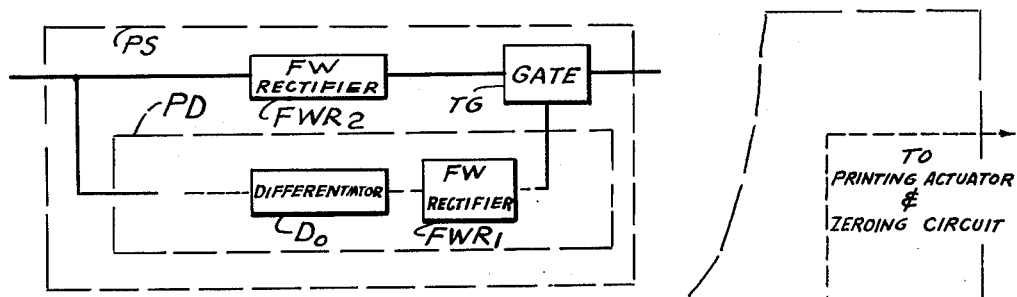
Figure 6:
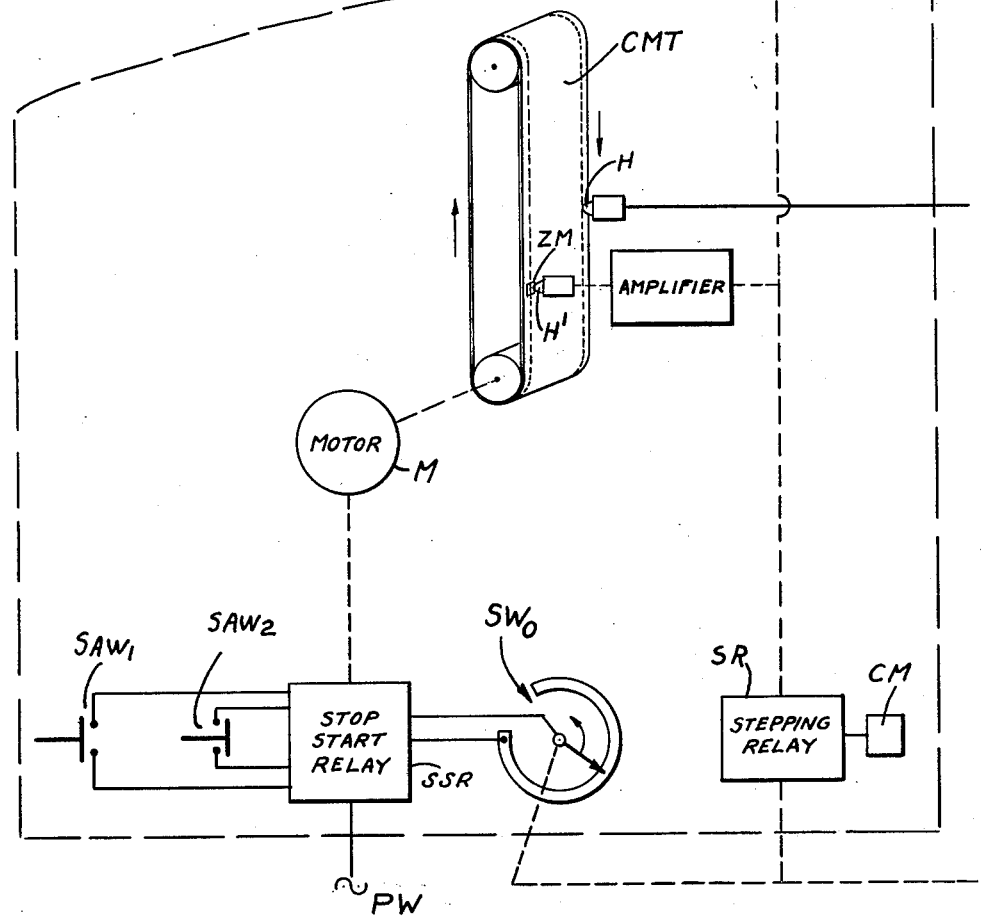

FIGS. 3A, 3B, 3C, and 3D are schematic diagrams of various parts of the wave analyzer of FIG. 1;

FIG. 3 is a diagram showing how FIGS. 3A, 3B, 3C, and 3D are arranged to form a complete system as illustrated in FIG. 1;

FIG. 4 represents part of an alternative embodiment of the invention;

FIG. 5 is a block diagram of a part of an alternative embodiment of the invention; and FIG. 6 is a schematic diagram of certain parts of an alternative embodiment of the invention.

Referring to FIG. 1 and to FIGS. 3A, 3B, 3C, and 3D, in which the main parts of an embodiment of our invention are illustrated, there is shown a histogram generator that comprises five main stages; namely, an automatic record player RP, and amplifier unit AU, a filter system FS, an amplitude or peak selector PS, an amplitude spectrometer AS comprising amplitude range detectors AG and pulse counters CT, and a printer PT. The record player RP is of the automatic type which repeatedly plays the same record. This record player is so designed that only a selected portion of the record is played over and over during the analysis. The record player RP operates to substitute one band pass filter for another in the filter systems FS each time the record is replayed. The record player also makes selected changes in the peak selector PS in a coordinated manner so that the operation of the peak detector PD, FIG. 3C, is properly coordinated with the selection of the filters so as to accurately detect the peaks of wave pulses in each frequency range. Clock pulses having amplitudes of those peaks are generated by the action of the peak selector, and the amplitude spectrum of those clock pulses is determined with the amplitude spectrometer. The record players also operates the printer PT upon the completion of the analysis in each frequency band so as to record on a histogram a column of amplitude spectrum data corresponding to each frequency band.

A typical histogram of the type produced with our system is illustrated in FIG. 2. In this histogram, the numbers in the respective columns represent the frequency of occurrence of wave pulses having amplitudes in predetermined amplitude ranges, when the output of the record player RP is passed through different filters in the filter system, as indicated by the designations 0, 1, 2, . . . 9, 10, at the bottoms of the columns.

The record to be analyzed may be recorded in various ways. Conventionally, when a guided missile or the like is being studied, it is customary to locate a force detector, such as an accelerometer, on the guided missile and to utilize the response of the detector to frequency modulate a radio wave which is transmitted to a ground station where the received wave is recorded on a magnetic tape as a frequency-modulated wave. On such a record, the instantaneous value or amplitude of the acceleration or other phenomenon detected is recorded as a function of time. For simplicity, such a record is referred to hereinafter as a forcing function record. This term is broadly used to indicate any variable phenomenon, whether it be a force, temperature, pressure, or the like, which varies as a function of time at the position of the detector and which is transmitted through a system to a device the operation of which it affects. Though the invention is described herein with particular reference to the use of a frequency-modulated magnetic tape record of a forcing function, it will be understood that the invention may also be applied to the analysis of other phonographic, or reproducible, records.

As shown in FIG. 3A, the magnetic tape MT to be analyzed is mounted in conventional manner on wheels W1 and W2, which can be operated by means of a reversible motor M to drive the tape either in one direction or the opposite direction past a magnetic pickup head or detector H. When the magnetic tape MT is driven past the head H, the frequency-modulated waves recorded on the magnetic tape are reproduced and are passed through a frequency modulation discriminator FMD, thereby reproducing at the output of the discriminator an electrical wave having an amplitude that varies in time in the same way that the amplitude of the original force varied as a function of time. The output of the discriminator FMD is applied to an amplifier A, the output of which is then passed through an attenuator AT which is employed to set the level of the wave at some desired average amplitude. Where the original force varies in a random fashion, the reproduced electrical wave also varies in random fashion, as indicated by the graph $G_1$, at the output of the amplifier unit. As mentioned above, the record player RP is of a type which automatically replays a selected section of the record, thereby automatically reproducing the forcing function $G_1$ (see FIG. 3B) at the output of the amplifier unit AU repeatedly.

The motor M drives not only the wheels W1 and W2, but also a tape length meter TLM. The tape length meter TLM is provided with a pointer PR, which moves in front of a dial face DF to indicate the amount of record MT that has been advanced past the head H starting from some initial reference point on the record. The pointer PR is composed of metal and is grounded. This pointer is adapted to contact a forward contact WK when it advances counterclockwise and to contact a reversing contact VK when it advances clockwise.

The controls of the record player RP also include a forward relay FR, a reverse relay RR, a main control relay CR, a motor reversing circuit MR, a twelve-position stepping relay SR, a stop-start relay SSR, a start switch SAW, and a stop switch SOW. The motor reversing circuit MR is of such a type that it drives the motor M in a forward direction $f$ when the main control relay CR is operated and in the reverse direction $r$ when the main control relay is restored. The stepping relay SR is of a type which includes five rotary switches $SW_0$, $SW_1$, $SW_2$, $SW_3$, and $SW_4$. The switches $SW_1$, $SW_2$, $SW_3$, and $SW_4$ have contacts that are arranged in series in corresponding positions and which are successively closed each time the stepping relay is operated. Switch $SW_0$ has an arcuate wiper blade WB that extends to all positions except one. The switch $SW_0$ is located in the record player RP, switches $SW_1$ and $SW_2$ in the filter system FS, and switches $SW_3$ and $SW_4$ in the peak filter PF. A printing wheel PW ganged with the switches $SW_0$ . . . $SW_4$ is employed to indicate the positions in which the switches are located at any one time. For this purpose, the printing wheel PW carries printing elements bearing numbers 0, 1, 2 . . . 10 corresponding to the eleven active positions of the stepping relay SR but no element corresponding to the inactive position of the stepping relay SR.

The stepping relay SR is so arranged that it is operated each time the main control relay CR is operated. The forward relay FR is connected to operate the main control relay CR when the forward contact WK is contacted by the pointer PR, and the reversing relay is arranged to restore the main control relay CR when the reversing contact VK is contacted by the pointer PR. The forward relay FR and the reverse relay RR are operated only while the corresponding contact WK or VK, respectively, is in contact with the pointer PR. The restoration of either the forward relay FR or the reverse relay RR does not affect the operation of the main control relay CR. The main control relay CR is of a type that operates when the forward relay FR operates and restores when the reverse relay RR operates.

As indicated by the arrows $a$, the forward and reversing contacts WK and VK may be adjusted in position on the dial face DF in order to select the portion of a record to be automatically played and replayed. With the contacts WK and VK so set, and with the motor M energized, the tape is driven in a forward direction, as indicated by the arrow $f$, thus causing a recorded forcing function to be reproduced as an electrical wave $G_1$ at the output of the amplifier unit AU. As the record MT is advanced in a forward direction past the pickup head, the pointer PR moves clockwise across the face of the dial, finally contacting the reversing contact VK. When this occurs, the reversing relay RR operates, thus restoring the main control relay CR, which in turn reverses the motor reversing circuit MR to reverse the direction of rotation of the motor M. Immediately, the motor M stops and reverses its direction of rotation, thus causing the direction of the movement of the record MT to be reversed and the record to travel in the reverse direction as indicated by the letter $r$. As the movement of the tape continues in a reverse direction, the pointer PR moves in a counterclockwise direction, finally making contact with the forward contact WK. The closure of the pointer PR with the forward contact WK operates the forward relay FR, thus operating main control relay CR and reversing the motor reversing circuit MR, thus causing the motor M to stop again and then to rotate in its forward direction, thereby causing the record MT to again travel in its forward direction $f$.

In the specific embodiment of the invention, the main control relay CR includes a pair of normally open contacts $CR_1$ which are connected in the output of the filter system FS, as shown in FIG. 3B, so that a signal is transmitted from the filter system FS to the peak filter PF only when the record MT is travelling in the forward direction.

The filter system FS comprises a plurality of band pass filters, in this case ten (10) such filters, $F_1, F_2, \ldots F_{10}$. Each of these filters is adapted to pass wave components in a predetermined band and to attenuate wave components outside of that band. In the specific embodiment of the invention illustrated, each of the filters $F_1, F_2, \ldots F_{10}$ passes waves lying within a single octave. The filter $F_1$ passes waves in the frequency range between 6.25 and 12.5 c.p.s. The filter $F_2$ passes waves in the frequency range between 12.5 and 25.00 c.p.s. Similarly, the remaining filters $F_1$ up to the filter $F_{10}$ pass successive octaves, the filter $F_{10}$ passing the octave between 3200 and 6400 c.p.s.

As the term is used in this specification, the cutoff frequencies of a filter are those at which the attenuation is about 6 db below the attenuation at the midband frequency, where the attenuation is nearly uniform. For best results, the cutoff frequencies of each filter are less than an octave apart, and the attenuation at the cutoff frequency changes rapidly with frequency. A suitable rate of attenuation is about 18 db/octave. But an attenuation of as much as 72 db/octave is even better. In a filter having optimum characteristics, the attenuation at one frequency $f$ is about 6 db and the attenuation at the octave frequency $2f$ is about 20 db or more. In such an arrangement, successive lobes of the filtered wave almost always have opposite polarities, thus increasing the reliability of the system in counting peaks in different amplitude ranges.

The switches $SW_1$ and $SW_2$ are located respectively at the input and output of the filter system FS. The input switch $SW_1$ has twelve contacts $T_0', T_1', T_2' \ldots T_{11}'$. The two contacts $T_0'$ and $T_{11}'$ are idle. The remaining contacts $T_1', T_2' \ldots T_{10}'$ are connected to the input of the respective corresponding band-pass filters. The output switch $SW_1$ has twelve contacts $T_0'', T_1'', T_2'' \ldots T_{10}''$, and $T_{11}''$. The two contacts $T_0''$ and $T_{11}''$ are idle. The remaining contacts $T_1'', T_2'' \ldots T_{10}''$ are connected to the output of the respective corresponding band-pass filters. Each of the switches $SW_1$ and $SW_2$ has a corresponding rotary arm $SA_1$ and $SA_2$, which are ganged to move together and to make contact with the respective contacts $T_0', T_1', T_2'$, and $T_0'', T_1'', T_2''$ consecutively each time the stepping relay is operated. Thus, when the rotary arms $SA_1$ and $SA_2$ contact either of the idle contacts $T_0$ and $T_{11}$, no waves are transmitted from the output of the amplifier unit AU to the filter system FS. However, when the rotary arms RA contact any one of the remaining contacts $T_1, T_2, \ldots T_{10}$, components of the wave $G_1$ lying in the band of the corresponding filter $F_1, F_2, \ldots F_{10}$ are transmitted through the filter system FS. The filtered wave appearing in the output of the filter system FS thus has a somewhat different shape from that of the input wave, as represented by graph $G_2$ shown in FIG. 3C.

Though the characteristics of the filters $F_1, F_2 \ldots F_{10}$ may be selected in other ways, it is best practice to maintain a constant ratio between the high frequency cutoff and the low frequency cutoff frequencies of successive filters and to utilize the high frequency cutoff of each filter except the last as the low frequency cutoff frequency for the next filter in sequence. Though the ratio of adjacent cutoff frequencies of the filters $F_1$ to $F_{10}$ is unity in the example given, it is clear that this ratio may have other values. But in the best practice the cutoff frequencies of each filter are less than an octave apart.

The filtered wave $G_2$ appearing in the output of the filter system is then passed into a peak selector PS that converts the filtered wave into a series of discrete pulses which have amplitudes equal to the peak amplitudes of the successive wave pulses of the filtered wave.

The peak selector PS includes a time gate TG connected between the output of the filter system FS and the amplitude spectrometer AS. The peak selector PS also includes a peak detector PD controlled by the filtered wave $G_2$ for detecting the occurrence of peaks in the filtered wave and for opening the time gate TG momentarily when these peaks are detected. By virtue of this action, a pulse appears at the output of the gate each time a peak occurs in the form of the filtered wave $G_2$ and the amplitude of the pulse at the output of the time gate TG is proportional to the amplitude of the peak of the corresponding wave pulse of the filtered wave. The peak detector of the present embodiment of the invention is designed to detect only peaks of a specific polarity.

More particularly, as illustrated in FIG. 3C, a bank of differentiators D1, D2, ... D10 are arranged at the input of the peak detector. The switches $SW_3$ and $SW_4$ are located respectively at the input and output of the bank of differentiators. The input switch $SW_2$ has twelve contacts $T_0''', T_1''', T_2''' \ldots T_{10}''', T_{11}'''$. The two contacts $T_0'''$ and $T_{11}'''$ are idle. The remaining contacts $T_1''', T_2''' \ldots T_{10}'''$ are connected to the inputs of the corresponding differentiators. The output switch $SW_4$ has twelve contacts $T_0'''', T_1'''', T_2'''' \ldots T_{10}''''$, and $T_{11}''''$. The two contacts $T_0''''$ and $T_{11}''''$ are idle. The remaining contacts $T_1'''', T_2'''' \ldots T_{10}''''$ are connected to the outputs of the corresponding differentiators. Each of the switches $SW_1$ and $SW_2$ has a corresponding rotary arm $SA_3$ and $SA_4$, which are ganged to move together and to make contact with the respective contacts $T_0''', T_1''', T_2''', \ldots T_0'''', T_1'''', T_2'''', \ldots$ consecutively each time the stepping relay is operated. Furthermore, the rotary arms $SA_3$ and $SA_4$ are ganged with the rotary arms $SA_1$ and $SA_2$ of the filter system FS so that all the rotary arms are in corresponding positions simultaneously. The rotary switch arms $SA_1$, $SA_2$, $SA_3$, and $SA_4$ are all operated together so that they simultaneously contact four corresponding contacts that are located in the same numerical positions in the respective sets of contacts. Thus, all four rotary switch arms $SA_1$, $SA_2$, $SA_3$, and $SA_4$ contact corresponding idle contacts $T_0'$, $T_0''$, $T_0'''$, and $T_0''''$ at the same time, and they also contact idle contacts $T_{11}'$, $T_{11}''$, $T_{11}'''$, and $T_{11}''''$ at the same time. In addition, all four rotary switch arms $SA_1$, $SA_2$, $SA_3$, and $SA_4$ simultaneously contact the contacts $T_1'$, $T_1''$, $T_1'''$, and $T_1''''$. Similarly, all four rotary switch arms $SA_1$, $SA_2$, $SA_3$, and $SA_4$ simultaneously contact the contacts $T_2'$, $T_2''$, $T_2'''$, and $T_2''''$, and so on. In this way, when any one of the filters $F_1$, $F_2$, $F_3$ is connected in the filter system FS, the corresponding detector $D_1$, $D_2$ or $D_3$ is connected in the peak detector PD.

The differentiators $D_1$, $D_2$, $D_3$ are of conventional form. However, the cutoff frequency of each of the detectors $D_1$, $D_2$, $D_3$ is designed to be proportional to the mid-band frequency of the corresponding filter $F_1$, $F_2$, $F_3$, etc. In practice the cutoff frequency of each of the differentiators is high compared with the high cutoff frequency of the corresponding band pass filter. Thus, for example, the cutoff frequency of a specific differentiator such as the differentiator $D_1$ has a cutoff frequency of 125 c.p.s., which is ten times the high cutoff frequency 12.5 of filter $F_1$ and twenty times the low cutoff frequency 6.25 of the band filter $F_1$. The same proportions are employed with respect to the other frequency bands.

By way of example, assume that the filter $F_5$ is connected in the filter circuit FS and that the differentiator $D_5$ is connected in the peak detector PD and that the output of the filter $F_5$ is represented by graph $G_2$. In this case, the output of the differentiator $D_5$ is represented by the graph $G_3$. The graph $G_2$ is aperiodic and is characterized by a series of wave pulses of different duration and amplitude. Likewise, the wave $G_3$ representing the output of the filter $D_5$ is aperiodic and is characterized by a sequence of wave pulses of different duration and amplitude. However, each time the positive or negative peak appears on the filtered input wave $G_2$ the instantaneous amplitude of the differentiated output wave $G_3$ is zero.

The slope of the differentiated wave is negative when the peak amplitude of the corresponding wave pulse of the filtered wave $G_2$ is positive and is positive when the peak amplitude of the corresponding wave pulse of the filtered wave $G_2$ is negative. In the peak detector PD the differentiated wave $G_3$ is passed through a high gain amplifier and first clipper $CL_1$. There the successive wave pulses of the differentiated wave $G_3$ are converted into square wave pulses of equal amplitude but of durations equal to those of the wave pulses of the differentiated wave. Such square wave pulses are shown in graph $G_4$. The output of the clipper $CL_1$ is then passed through a differentiator $D_0$ where the negative-going parts of wave $G_4$ generate negative pulses of short duration and the positive-going parts of the square waves generate sharp positive pulses as shown in graph $G_5$. The output of the differentiator $D_0$ is then passed through a second clipper $CL_2$ where the positive pulses are removed as shown in graph $G_6$. The remaining short negative pulses are employed to open the time gate TG momentarily each time one of these negative pulses occurs. The time gate TG is of a type that is closed when quiescent and can be opened to pass a signal only when a negative gating pulse having an amplitude exceeding a predetermined value is applied to it from the clipper $CL_2$.

By virtue of this action, a series of pulses appear in the output of the time gate which have amplitudes proportional to the amplitudes of the positive parts of the wave pulses of the filtered wave $G_2$. Thus the form of the wave appearing at the output of the time gate as illustrated in graph $G_7$ is in the form of a train of "clock pulses." The characteristics of the differentiator $D_0$ that is connected between the clippers $CL_1$ and $CL_2$ is such that the duration of the clock pulses is less than the duration of any of the significant wave pulses existing in the original electrical wave $G_1$.

The clock pulse wave train $G_7$ is then applied to the amplitude spectrometer as shown in FIG. 3D, where the numbers of pulses lying within predetermined amplitude ranges are counted. The amplitude spectrometer may be in the form of a pulse amplitude analyzer of conventional type. Such analyzers are described, for example, in a series of articles by A. B. Van Rennes published in the July, August, and September 1952 issues of Nucleonics under the title "Pulse Amplitude Analysis in Nuclear Research." By way of example, as illustrated in FIG. 3D, the amplitude spectrometer may comprise a plurality of amplitude gates $AG_1$, $AG_2$, ... $AG_6$, each of which is adapted to produce a pulse at its output only when a pulse lying within a corresponding predetermined amplitude range is applied to its input. For convenience, the amplitude of the pulses is merely designated in percentages of an arbitrary pulse height. For example, the amplitude gate $AG_1$ responds to pulses having an amplitude between 0% and just less than 20%. Similarly, the amplitude gate $AG_2$ responds to pulses having amplitudes of 20% to just less than 40%; amplitude gate $AG_3$ responds to pulses having amplitudes of 40% to just less than 60%; amplitude gate $AG_4$ responds to pulses having amplitudes of 60% to just less than 80%; and amplitude gate $AG_5$ responds to pulses having amplitudes of 80% to just less than 100%. The amplitude gate $AG_6$, however, responds to all pulses having an amplitude of 100% or more.

The amplitude spectrometer also comprises a plurality of pulse counters $CT_1$, $CT_2$, ... $CT_6$ connected respectively to the outputs of the corresponding amplitude gates $AG_1$, $AG_2$, ... $AG_6$. The counters $CT_1$, $CT_2$, ... $CT_6$ may be of conventional type. Each of the counters is connected to count the number of pulses appearing in the output of the corresponding amplitude gate. Thus the counter $CT_1$ counts the number of pulses of the wave $G_7$ that is less than 20%, and the counter $CT_2$ counts the number of pulses of the wave $G_7$ that have amplitudes that are less than 40% but are not less than 20%. Similarly, the counters $CT_3$, $CT_4$, and $CT_5$ count the number of pulses of the wave $G_7$ lying within the ranges to which the corresponding amplitude gates $AG_3$, $AG_4$, and $AG_5$ are responsive. Likewise, the counter $CT_6$ counts the number of pulses having an amplitude equal to 100% or more. A zeroing circuit ZC common to all of the counters $CT_1$, $CT_2$, ... $CT_6$ is employed to restore the count of each of the counters $CT_1$, $CT_2$, ... $CT_6$ to zero between successive passes of the magnetic tape record MT past the head H. The zeroing circuit ZC is of a type which is adapted to operate each time the main control relay CR operates at the commencement of the forward movement of the tape MT.

The printer PT comprises a plurality of printing units $P_1$, $P_2$, ... $P_6$ on which are registered at any time the number of pulses that have been counted by corresponding counters $CT_1$, $CT_2$, ... $CT_6$, respectively. A printing actuator PA is included in the printer PT in order to actuate the printer in order to read out the information stored on the printing units $P_1$, $P_2$, ... $P_6$ upon the completion of each pass of the magnetic tape record MTR. The printing actuater PA is of a type which is operated when the main control relay CR is restored at the time that a pass of the record is completed.

It is to be noted that the zeroing circuit ZC is operated only after the printing actuator has been operated. In the specific embodiment of the invention illustrated in FIG. 3, this delay is produced by virtue of the fact that the printing actuator is responsive to the restoration of the main control relay CR, while the zeroing circuit ZC is responsive to operation of the main control relay. In an alternative arrangement, the zeroing circuit can be operated by the printing actuator itself upon completion of the printing operation, as indicated by the arrangement shown in FIG. 4.

When the printer PT is actuated by operation of the printing actuator PA, the counts registered on the respective printing units $P_1, P_2, \ldots P_6$ are printed on a strip of record paper RP. Upon completion of the printing operations, the strip of paper RP is automatically advanced or stepped a predetermined amount, thus placing a clear portion of the strip of paper in position to be printed upon the next time that the printer is operated.

In practice, a stop-start relay SSR is connected between a source of power PS and the motor reversing circuit MR. A rotary switch having a rotary arm OA and a contact $R_0$ is ganged with the other rotary switches of the stepping relay SR so that when the arms $SA_1$, $SA_2$, $SA_3$, and $SA_4$ of these other rotary switches reach position 11, the rotary arm OA also reaches position 11, thus opening a sticking circuit and restoring the stop-start relay SSR. In all other positions, however, the rotary arm OA contacts a wiper blade WB, which maintains the stop-start relay SSR operated.

The stop-start relay SSR may be a relay of the sticking type, which can be operated upon momentary closure of a first part $SAW_1$ of the switch SAW and which may be restored by opening of a first part $SOW_1$ of the stop switch SOW. A second part $SAW_2$ of the start switch SAW is employed for initially operating the forward relay FR, while a second part $SOW_2$ of the stop switch SOW is employed to operate the reverse relay RR. As previously explained, operation of the forward relay FR causes the main relay CR to operate, and operation of the reverse relay RR causes the main control relay CR to be restored. The two parts $SAW_1$ and $SAW_2$ of the start switch SAW are operated simultaneously upon manual actuation of the start switch SAW and the two parts $SOW_1$ and $SOW_2$ of the stop switch SOW are operated simultaneously upon manual actuation of the stop switch SOW.

In order to consider how the histogram generator of this invention operates, assume by way of example that the system is connected and that the stepping relay is in position 11 and that the main control relay CR is restored and that the motor reversing circuit MR is in a condition to cause the motor M to rotate in a forward direction when energized. Also assume that the magnetic tape MT has been positioned on the wheels $W_1$, $W_2$ and that the contacts WK and VK have been located at selected positions to select a particular predetermined length of the record MT for analysis but that the pointer PR is at an intermediate position.

Starting from this condition of the system, the start-switch SAW is depressed. The closure of the second part SAW2 of the start switch SAW causes the stepping relay SR to operate and to advance one step. Such action brings rotary arm OA in contact with the wiper blade WB completing the sticking circuit of the start-stop relay SSR. By employing a stop-start relay SSR of the slow-to-release type, completion of the sticking circuit is assured even though the start switch SAW is depressed only momentarily. Also, by utilizing a stop-start relay SSR of the slow-to-operate type, energization of the motor M is delayed until the motor reversing circuit MR has had an opportunity to respond to the operation of the main control relay CR. This latter condition is important if the motor reversing circuit MR is initially in condition to cause the motor M to rotate in the reverse direction when energized. Simultaneously the switch arms $SA_1$, $SA_2$, $SA_3$ and $SA_4$ are moved from their idle contacts $T_{11}$ at position 11 to other idle contacts $T_0$ at position 0. Similarly, simultaneously rotary arm OA advances from its idle position to its 0 position where it contacts the wiper blade WB thus closing the sticking circuit. As a result the start-stop relay SSR remains operated when the parts $SAW_1$ and $SAW_2$ of the start switch SAW are opened. Simultaneously the operation of the main control relay CR operates the zeroing circuit, thus erasing any count that might be stored in the counters $CT_1, CT_2, \ldots CT_6$.

Operation of the start-stop relay SSR thus causes the motor M to be driven in a forward direction $f$. At this particular time the switches in the filter system FS are open because the switch arms $SA_1$ and $SA_2$ are in the 0 position. As the tape MT advances in the forward direction, an electric signal $G_1$ is produced at the output of the amplifier unit AU. However, no signal appears at the output of the filter system FS because the switches both at the input and at the output are open.

During the pass of a record that occurs while the stepping relay is in position 0 the output of amplifier unit AU may be measured in any desired way and the attenuator AT set in order to establish the average output at any desired level.

When the tape MT has reached the end of its pass the pointer PR of the tape length meter TLM contacts the reversing contact VK operating the reverse relay RR thus restoring the main control relay CR. The restoration of the main control relay CR operates the printing actuator, in this case printing a set of zeros in the first, or left hand, column of the histogram sheet. Simultaneously a numeral 0 is printed at the bottom of the column in order to properly indicate that the stepping relay is in its "0" position. Restoration of the main control relay also causes the stepping relay SR to operate, stepping the relay from the "0" position to the "1" position. Such a stepping action causes the rotary arms $SA_1$, $SA_2$, $SA_3$, $SA_4$ to move to position 1 thereby connecting the filter $F_1$ between the input and the output of the filter system FS and connecting the differentiator $D_1$ in the peak detector PD. Simultaneously restoration of the main control relay CR operates to reverse the motor reversing circuit MR causing the direction of rotation of the motor M to be reversed thus driving the magnetic tape MT in the reverse direction $r$. As the record MT is driven in the reverse direction the contact $CR_1$ remains open.

As the record MT is driven in the reverse direction the pointer PR is driven counter-clockwise. Finally, when the starting point of the record MT is reached the pointer PR contacts the forward contact WK, completing a circuit which operates the forward relay FR thereby operating the main control relay CR. Operation of the main control relay CR again operates the zeroing circuit ZC. In this case the operation of the zeroing circuit is ineffective since the counters $CT_1, CT_2, \ldots CT_6$ are already in the zero state. Operation of the main control relay CR also causes contact $CR_1$ to close, thus completing the circuit between the output of the filter system and the input of the peak filter PF. Operation of the main control relay CR also causes the motor reversing circuit to be reversed thus reversing the direction of rotation of the motor M causing it to drive the tape MT in a forward direction F past the pickup head H.

With the filter $F_1$ and the differentiator $D_1$ connected in the circuit and with the record MT thus advancing in a forward direction, the original forcing wave recorded on the magnetic tape is reproduced as an electrical wave represented by the graph $G_1$ in the output of the amplifier unit AU. After filtering by the filter $F_1$ the filtered wave $G_2$ is impressed on the input of the time gate TG. Intermittently, each time a wave pulse of this wave $G_2$ attains a peak amplitude the gate TG is opened thereby generating a corresponding short-time pulse at the output of the gate having an amplitude proportional to the peak of the wave pulse applied to the input of the time gate TG. As the record MT continues to move in front of the pickup head H, a series of such pulses as represented in graph $G_7$ are generated at the output of the gate and impressed upon the inputs of the amplitude gates $AG_1$, $AG_2$, ... $AG_6$ of the amplitude spectrometer AS. The pulses in the various amplitude ranges are counted by means of the counters $CT_1$, $CT_2$, ... $CT_6$ thus actuating the corresponding printer elements $P_1$, $P_2$, ... $P_6$.

Upon completion of the pass of the record MT past the pickup head H the pointer PR of the tape length meter TLM again contacts the reversing contact VK operating the reverse relay RR thus restoring the main control relay CR. This time the restoration of the main control relay operates the printing actuator PA causing it to print a series of numbers in the next column of the histogram sheet RP. Simultaneously the number "1" is printed at the bottom of the column to indicate that the numbers in this column represent the counts of pulses in the respective amplitude ranges detected when the wave $G_1$ is filtered by the band pass filter $F_1$. At the same time the restoration of the main control relay CR causes contacts $CR_1$ to open, disconnecting the filter system FS from the peak filter PF. Restoring of the main control relay CR also causes the stepping relay SR to operate advancing the arms OA, $SA_1$, $SA_2$, $SA_3$, and $SA_4$ to their second positions. Such stepping disconnects filter $F_1$ and substitutes filter $F_2$ between the input and the output of the filter system FS. Simultaneously the differentiator $D_1$ is disconnected from the peak detector and the differentiator $D_2$ is connected in the peak detector. The restoring of the main control relay CR also reverses the motor reversing circuit causing the direction of rotation of the motor M to change from a forward direction to a reverse direction thus again driving the record MT in the reverse direction $r$.

When the pointer PR is again moved to its starting position where it contacts the start contact WK, the forward relay FR is again operated causing the record MT to advance in a forward direction and again causing the pulses appearing in the wave $G_2$ to be counted. In this case, however, the wave $G_2$ has been differently filtered and the number of pulses appearing in the wave will normally be greater than before. The distribution of amplitudes of pulses is also usually different than previously. In this case when the pass of the record MT is completed, the reverse relay RR is again operated and the main control relay CR restored, again causing a set of data representing the counts of pulses to be printed in the second column above the figure "2" which indicates that the data corresponds to the filter $F_2$. Again the movement of the tape is reversed in the manner described above and the process is repeated causing a series of data to be printed on the paper forming a complete histogram as illustrated.

At the time the main control switch CR is restored while the stepping relay is in position 10, data is printed in the last column of the histogram. This data corresponds to the wave $G_2$ appearing at the output of the filter system FS with the filter $F_{10}$ connected therein. As usual after printing a column of figures, when the main control switch CR is restored at this time, the motor reversing circuit MR is reversed again, causing the record MT to be driven in the reverse direction. However, at this time, when the stepping relay SR steps from position 10 to position 11, all five rotary switches $SW_0$, $SW_1$, $SW_3$, and $SW_5$ are opened. The opening of switches $SW_1$, $SW_2$, $SW_3$, and $SW_4$ disconnects all the filters $F_1$ ... $F_{10}$ and all the differentiators $D_1$ ... $D_{10}$. At the same time, the opening of the switch $SW_0$ breaks the sticking circuit of the stop-start relay SSR, restoring this relay and thereby disconnecting the power source PS from the motor reversing switch MR. As a result the rotation of the motor M and the movement of the record MT comes to a halt.

No information is printed on the histogram while the stepper motor is in position "11." The reason for this is that shortly after the data corresponding to the use of filter $F_{10}$ is employed, the motor M stops, even though the record MT may have been driven in the reverse direction. When operation is again resumed by pressing of the start switch SAW forward motion of the motor is resumed and the stepping relay is advanced to its number 0 position and operation continues as described above.

After the record player RP has stopped the record MT may be replaced by another which is to be analyzed, or if desired, the contacts WK and VK may be moved in order to permit analysis of a different part of the record MT. But in any event, when a record MT is again ready for analysis, the starting switch SAW may again be operated, closing the starting switch parts $SAW_1$ and $SAW_2$ again causing the record MT to advance in the forward direction $f$ and advancing the stepping relay SR from its 11 position to its 0 position. When this occurs the sticking circuit which includes the switch SWO is completed thus causing the stop-start relay SSR to remain energized after the starting switch SAW is cleared. A second histogram may thus be made in the same manner as described above. And the process may be repeated again and again with different sections of the forcing function record MT or with different forcing function records MT as may be desired to provide a whole series of histograms.

The operation of the histogram generator may be stopped at any time desired by pressing the stop switch SOW. Such action opens the switch part $SOW_1$ restoring the stop-start relay SSR and also closes the stop switch part $SOW_2$ thus operating the reverse relay RR. Suitable conventional control means CM are also provided for stepping the relay SR independently of the operation of the motor M so that the stepping relay may be reset in its idle position 11. It is to be noted that this reset action may be achieved without operation of the printer PT since the printing actuator PA is controlled by the master control relay CR.

Other ways also exist for repeatedly playing a record automatically in accordance with our invention. For example, a single filter may be used in the filter system FS and a single differentiator D in the peak detector PD. In this case, the record is repeatedly played at different speeds, thus shifting the time scale of the reproduced electrical wave $G_1$. When this is done, the pulse counts registered by the counters $CT_1$, $CT_2$ ... $CT_6$ are printed for each such speed. In this way a histogram is produced having the same data as the foregoing. In interpreting such a histogram, it is only necessary to recall that when the speed of the record MT is increased by the factor M and the characteristics of the filter system FS are maintained constant, the same results are achieved as if the speed of the record had been maintained constant and the cutoff frequencies of the filter had been reduced by the factor M.

In the systems described above, only positive wave pulses have been counted. Pulses of both polarity are counted by replacing the clipper $CL_2$ with a fullwave rectifier $FWR_1$ and connecting a second fullwave rectifier $FWR_2$ at the input of the gate TC. Such an arrangement is illustrated in FIG. 5. In this arrangement, a series of negative gating pulses occur at the times of occurrence of all zero values of the derivative of the wave $G_2$.

In another way of practicing the invention, a section of a record to be analyzed is re-recorded on an endless loop, and the loop is driven continuously past a pickup head H. In this case, an actuating marker carried by the loop is arranged to operate the stepping relay SR each time the actuating marker AM passes a position adjacent an auxiliary pickup head H'. A system of such a type employing an endless loop is illustrated schematically in FIG. 6.

In such a system, the signals detected by the auxiliary pickup head H' are amplified to produce control pulses. These control pulses are applied to the stepping relay SR to cause it to step in the same way as do the pulses from the main control relay of FIG. 3A. The pulses from the output amplifier are also impressed upon the zeroing circuit ZC and the printing actuator PA in order to produce the desired printing and zeroing operation. It is to be noted that in the modification of FIG. 6 the motor reversing circuit MR is omitted. The main control relay CR and the tape length meter TLM and the various associated parts shown at the upper part of FIG. 3A are also omitted.

With the system of FIG. 6, the stepping relay SR is operated each time the zero mark ZM passes the auxiliary pickup head H'. In this case, no contact CR is employed in the output of the filter system FS. Thus the output of the filter system is always directly connected to the peak selector PS. Each time the main control relay CR operates, it operates the printer actuator PA of the printer PT and then the zeroing circuit AC of the amplitude spectrometer AS. The desired sequential operation may be achieved by employing an arrangement such as that illustrated in FIG. 3d, in which the zeroing circuit ZC is operated by the printing actuator PA. Simultaneously, each time the main control relay CR operates, it causes the stepping relay SR to step one position, thus substituting one filter and differentiator for another, as described above. In this way a histogram is again produced in the same form as before. Again, when the stepping relay reaches its "11" position, the stop-start relay SSR is restored, thus stopping the motor. The continuous magnetic tape record CMT is removed and replaced by another, and a histogram corresponding to the new record may be made by initiating operation again by pressing the start switch $SAW_1$.

It is thus seen that by means of our invention a histogram is produced which represents a series of pulse amplitude spectra in different bands of frequencies of the forcing function wave. By examining such a histogram, information can be obtained, not only as to the frequencies of component waves present in the forcing function, but also the relative frequency of occurrence of forcing function components lying within particular frequency bands. Such information is useful in the study and testing of components which may be subjected to the influence of such a forcing function when in use. Our invention is particularly applicable where it is desired to know the relative frequency of occurrence of wave pulses of particular amplitudes in particular frequency ranges.

In the system described above, the histogram represents the statistical distribution of the amplitudes of wave components in different frequency ranges. It will be understood, however, that the data of such a histogram may be readily employed to compute a power-density spectrum.

While specific apparatus has been illustrated and described for carrying out the principles of our invention, and while particular methods have been described by means of which our invention may be practiced, it will now be obvious to those skilled in the art that our invention may be practiced in other ways and may be embodied in many other forms. For example, the apparatus may be modified to produce a histogram when the tape is run only in the reverse direction, or the pulses may be counted as the tape is run in both directions. Also, to save time when the pulses are being counted as the tape is run in only one direction, the speed of travel of the tape may be increased when the tape is run in the opposite direction.

Furthermore, the filters may be made variable so that they may first be adjusted to have one set of cutoff frequencies and then to have another set of cutoff frequencies. In one application of such a variable filter system, the filters are adjusted to have cutoff frequencies somewhat less than one octave apart, one histogram is produced, the cutoff frequencies are then shifted by about half the band widths of the filters, and then a second histogram is produced. Such a method tends to eliminate errors that might arise by duplication of counts of pulses having strong wave components near the cutoff frequencies.

It is therefore to be understood that the invention is not limited to the specific apparatus described, or to the specific methods described, but that it may be practiced with other apparatus and in other ways within the scope of the appended claims.

We claim as our invention:

1. In the analysis of an oscillatory phenomenon, the steps which comprise:
   making a record of the manner in which the instantaneous amplitude of said oscillatory phenomenon varies as a function of time;
   repeatedly playing the record a plurality of times to repeatedly produce an electrical wave that corresponds to said oscillatory phenomenon;
   each time the record is played, filtering the electrical wave so produced in such a way as to filter out components of the wave lying outside a different predetermined band of frequencies, thereby producing a filtered electrical wave containing components lying within said predetermined band of frequencies; and
   measuring the number of wave pulses of each said filtered wave that have amplitudes that lie in different predetermined peak amplitude ranges.

2. In the analysis of a record of an oscillatory wave in which the instantaneous amplitude is recorded as a function of time, the steps which comprise:
   repeatedly playing the record a plurality of times to repeatedly produce an electrical wave that corresponds to said oscillatory wave;
   each time the record is played, filtering the electrical wave so produced in such a way as to filter out components of the wave lying outside a different predetermined band of frequencies, thereby producing a filtered electrical wave containing components lying within said predetermined band of frequencies; and
   measuring the number of wave pulses of each said filtered wave that have amplitudes that lie in different predetermined peak amplitude ranges.

3. In the analysis of a record of an oscillatory wave in which the instantaneous amplitude is recorded as a function of time, the steps which comprise:
   repeatedly playing the record to repeatedly produce an electrical wave that corresponds to said oscillatory wave;
   filtering the electrical wave so produced in such a way as to filter out components of the wave lying outside a predetermined band of frequencies, thereby producing a filtered electrical wave containing components lying within said predetermined band of frequencies; and
   counting the number of wave pulses of said filtered wave that have amplitudes that lie in a predetermined peak amplitude range the lower limit of which is greater than zero and the upper limit of which is less than the maximum amplitude of said filtered wave.

4. In a wave analysis system utilizing a record of an oscillatory wave, the combination of:
   means for playing the record of the oscillatory wave to reproduce said oscillatory wave as a corresponding electrical wave;
   means for filtering said electrical wave in a plurality of different ways, in each of which components of the waves lying outside a different predetermined band of frequencies are filtered out whereby a plurality of different filtered waves are produced, each filtered wave containing components lying in the corresponding predetermined frequency band; and
   means for measuring the number of wave pulses occurring in each said filtered wave that have amplitudes that lie in different predetermined peak amplitude ranges.

5. In a wave analysis system utilizing a record of an oscillatory wave, the combination of:
- means for playing the record of the oscillatory wave to reproduce said oscillatory wave as a corresponding electrical wave;
- means for filtering said electrical wave in a plurality of different ways, in each of which components of waves lying outside a different predetermined band of frequencies are filtered out whereby a plurality of different filtered waves are produced, each filtered wave containing components lying in the corresponding predetermined frequency band;
- means for measuring the number of wave pulses occurring in each said filtered wave that have amplitudes that lie in different predetermined peak amplitude ranges; and
- means for recording as a histogram the pulse amplitude distribution of said filtered waves as a function of frequency band characteristic.

6. In a system for analyzing a record of an oscillatory wave, the combination of:
- an automatic record player for repeatedly playing the record of the oscillatory wave and including means for reproducing said oscillatory wave as a corresponding electrical wave each time said record is played;
- an amplitude spectrometer having a plurality of amplitude gates connected to a common input, said amplitude gates being adapted to produce signals at its output only when the signals applied to said common input lie within different corresponding predetermined amplitude ranges;
- a filter system having an input connected to said record player and an output and comprising a plurality of band-pass filters having different band-pass characteristics;
- means controlled by said automatic record player for connecting said filters successively one at a time between the input and the output of said filter system each time said record is played, whereby an electrical wave is produced at the output of said filter system each time said record is played, which electrical wave comprises only components lying within a predetermined band of frequencies corresponding to the filter connected in said filter system;
- means controlled by the output of said filter system for applying to said amplitude spectrometer clock pulses which have amplitudes corresponding to the amplitudes of successive wave pulses of the electrical waves appearing at the output of said filter system; and
- means for measuring the relative number of signals produced by the respective amplitude gates during each play of the record.

7. In a system for analyzing a record of an oscillatory wave, the combination of:
- an automatic record player for repeatedly playing the record of the oscillatory wave and including means for reproducing said oscillatory wave as a corresponding electrical wave each time said record is played;
- an amplitude spectrometer having a plurality of amplitude gates connected to a common input, said amplitude gates being selectively responsive to signals that lie within different corresponding amplitude ranges and being adapted to produce signals at their outputs only when the signals applied to said common input have amplitudes that lie within the respective corresponding amplitude ranges;
- a filter system having an input connected to said record player and an output connected to said common input, said filter system comprising a plurality of band-pass filters having different band-pass characteristics;
- means controlled by said automatic record player for connecting said filters successively between the input and the output of said filter system one at a time each time said record is played, whereby an electrical wave is produced at the output of said filter system each time said record is played, which electrical wave comprises only components lying within a predetermined band of frequencies corresponding to the filters connected in said filter system; and
- means controlled by said amplitude gates for measuring the number of pulses in said electrical waves having amplitudes lying within the ranges corresponding to the respective amplitude gates.

8. In a system for analyzing a record of an oscillatory wave, the combination of:
- a source of an oscillatory electrical wave;
- an amplitude spectrometer having an input and comprising means for measuring the relative number of signals having amplitudes lying within the different amplitude ranges applied to said input;
- control means including a differentiator controlled by said electrical wave for producing control pulses when the amplitude of the electrical wave has its maximum value; and
- a time gate unit controlled by said control means for applying said electrical wave to the input of said amplitude spectrometer only when the derivative of the electrical wave is zero, whereby clock pulses having amplitudes corresponding to the peak amplitudes of wave pulses are applied to said spectrometer.

9. In a system for analyzing a record of an oscillatory wave, the combination of:
- a record player for playing a record of an oscillatory wave to reproduce said oscillatory wave as a corresponding electrical wave;
- an amplitude spectrometer having a plurality of amplitude gates connected to a common input, said amplitude gates being adapted to produce signals at their outputs only when the signals applied to said common input lie within different corresponding predetermined amplitude ranges;
- means controlled by said amplitude gates for measuring the relative number of signals having amplitudes lying within the ranges characteristic of the respective amplitude gates;
- control means including a differentiator controlled by said electrical wave for producing control pulses when the amplitude of said electrical wave has its maximum value; and
- a time gate unit controlled by said control means for applying said electrical wave to the input of said spectrometer only when the derivative of said electrical wave is zero, whereby clock pulses having amplitudes of successive wave pulses are applied to said spectrometer.

10. In a system for analyzing a record of an oscillatory wave, the combination of:
- a source supplying an oscillatory electrical wave;
- means controlled by said electrical wave for producing a series of clock pulses having amplitudes corresponding to the amplitudes of wave pulses of said electrical wave; and
- means including an amplitude spectrometer responsive to said clock pulses for measuring the relative number of wave pulses having peak amplitudes lying within different amplitude ranges that have different upper limits and different lower limits.

11. In a system for analyzing a record of an oscillatory wave composed of a series of pulse components of various amplitudes:
- an automatic record player including a control device, and means operated by said control device for repeatedly playing a selected portion of said record to reproduce said oscillatory wave repeatedly as a corresponding electrical wave;
- an electrical gate having an input and an output;

means for differently filtering said electrical wave during different plays of said selected record portion and for applying the filtered wave to the input of said gate;

and means controlled by the filtered electrical wave for opening said gate momentarily while parts of said filtered electrical wave having predetermined characteristics are being applied to the input of said gate, whereby a series of clock pulses having amplitudes corresponding to the predetermined characteristics of said parts of said filtered electrical wave is produced at the output of said gate.

12. In a system for analyzing a record of an oscillatory wave composed of a series of pulse components of various amplitudes:

an automatic record player including a control device, and means operated by said control device for repeatedly playing a selected portion of said record to reproduce said oscillatory wave repeatedly as a corresponding electrical wave;

an electrical gate having an input and an output;

means for differently filtering said electrical wave during different plays of said selected record portion and for applying the filtered wave to the input of said gate;

means controlled by the filtered electrical wave for opening said gate momentarily while parts of said filtered electrical wave having predetermined characteristics are being applied to the input of said gate, whereby a series of clock pulses having amplitudes corresponding to the predetermined characteristics of said parts of said filtered electrical wave is produced at the output of said gate;

an amplitude spectrometer comprising a plurality of amplitude gates, each of said amplitude gates being responsive to pulses applied thereto and having amplitudes lying in different predetermined amplitude ranges and also comprising a plurality of counters connected to the outputs of the respective amplitude gates for counting pulses to which the respective gates respond;

and means for simultaneously applying said series of clock pulses to all of said amplitude gates.

13. In a system for analyzing a record of an oscillatory wave composed of a series of pulse components of various amplitudes:

an automatic record player including a control device, and means operated by said control device for repeatedly playing a selected portion of said record to reproduce said oscillatory wave repeatedly as a corresponding electrical wave;

an electrical gate having an input and an output;

means for differently filtering said electrical wave during different plays of said selected record portion and for applying the filtered wave to the input of said gate;

means controlled by the filtered electrical wave for opening said gate momentarily while parts of said filtered electrical wave having predetermined characteristics are being applied to the input of said gate, whereby a series of clock pulses having amplitudes corresponding to the predetermined characteristics of said parts of said filtered electrical wave is produced at the output of said gate;

an amplitude spectrometer comprising a plurality of amplitude gates, each of said amplitude gates being responsive to pulses applied thereto and having amplitudes lying in different predetermined amplitude ranges and also comprising a plurality of counters connected to the outputs of the respective amplitude gates for counting pulses to which the respective gates respond;

means for simultaneously applying said series of clock pulses to all of said amplitude gates;

and a printer for producing a histogram of said oscillatory wave, said printer comprising a plurality of printing elements operated by the respective counters, means operated by said control device after completion of each play for stepping a record sheet past a printing position each time said record is to be replayed, whereby a different part of said record sheet is located in said printing position during each play, and means operated by said control device for actuating said printing elements after the completion of each play of said selected portion of said record to record the numbers of pulses in said filtered wave that lie in different amplitude ranges.

14. In a system for analyzing a record of an oscillatory wave composed of a series of pulse components of various amplitudes:

an automatic record player including a control device, and means operated by said control device for repeatedly playing a selected portion of said record to reproduce said oscillatory wave repeatedly as a corresponding electrical wave;

a plurality of electrical filters having different band-pass characteristics;

an electrical gate having an input and an output;

means operated by said control device for sequentially connecting said filters, one at a time, between said record player and the input of said gate whereby said electrical wave is filtered differently during different plays of said record;

and means controlled by the filtered electrical wave itself for opening said gate momentarily while the amplitude of said filtered electrical wave is a maximum, whereby a series of clock pulses having amplitudes corresponding to the peak amplitudes of said filtered electrical wave is produced at the output of said gate.

15. In a system for analyzing a record of an oscillatory wave composed of a series of pulse components of various amplitudes:

an automatic record player including a control device, and means operated by said control device for repeatedly playing a selected portion of said record to reproduce said oscillatory wave repeatedly as a corresponding electrical wave;

a plurality of electrical filters having different band-pass characteristics;

an electrical gate having an input and an output;

means operated by said control device for sequentially connecting said filters, one at a time, between said record player and said gate whereby said electrical wave is filtered differently during different plays of said record and for applying the filtered wave to the input of said gate means controlled by the filtered electrical wave itself for opening said gate momentarily while the amplitude of said filtered electrical wave is a maximum, whereby a series of clock pulses having amplitudes corresponding to the peak amplitudes of said filtered electrical wave are produced at the output of said gate;

an amplitude spectrometer comprising a plurality of amplitude gates, each of said amplitude gates being responsive to pulses applied thereto and having amplitudes lying in different predetermined amplitude ranges and also comprising means for indicating the numbers of pulses to which the respective amplitude gates respond;

and means for applying said series of clock pulses to all of said amplitude gates simultaneously.

16. In a system for analyzing an oscillatory wave composed of a series of pulse components of various amplitudes:

an electrical gate having an input and output means for applying said oscillatory wave to the input of said gate;

and means controlled by said oscillatory wave for opening said gate momentarily while parts of said oscillatory wave having predetermined characteristics are being applied to the input of said gate, whereby a series of clock pulses having amplitudes corresponding to the predetermined characteristics of said parts of said filtered electrical wave is produced at the output of said gate.

17. In a system for analyzing an oscillatory wave composed of a series of component pulses of various amplitudes:
    means for playing a record of said oscillatory wave to produce a corresponding electrical wave;
    an electrical gate having an input and an output means for applying said oscillatory electrical wave to the input of said gate;
    an amplitude spectrometer comprising a plurality of amplitude gates, each of said amplitude gates being responsive to component pulses applied thereto and having amplitudes lying in different predetermined amplitude ranges and also comprising a plurality of counters connected to the outputs of the respective amplitude gates for counting pulses to which the respective gates respond;
    means for converting said component pulses into a series of clock pulses that have amplitudes representative of the amplitudes of the respective component pulses;
    means for applying said series of clock pulses to all of said amplitude gates simultaneously;
    a printer for producing a record of the amplitude distribution of said pulse components, said printer comprising a plurality of printing elements operated by the respective counters, and means for actuating said printing elements after the completion of the playing of a selected portion of said record to record the numbers of said clock pulses in said series of clock pulses that have amplitudes that lie in different ampliture ranges.

18. In the analysis of a record of an oscillatory wave in which the instantaneous amplitude has been recorded as a function of time, the steps which comprise:
    repeatedly playing the record to repeatedly produce an electrical wave that corresponds to said oscillatory wave;
    simultaneously filtering the electrical wave so produced in a plurality of ways so as to produce a plurality of filtered electrical waves that respectively consist almost entirely of components that lie within different predetermined bands of frequencies; and
    counting the number of wave pulses of each said filtered electrical wave that have amplitudes that lie in a predetermined peak amplitude range, the lower limit of which is greater than zero and the upper limit of which is less than the maximum amplitude of said filtered wave.

19. In the analysis of a record of an oscillatory wave in which the instantaneous amplitude has been recorded as a function of time, the steps which comprise:
    repeatedly playing the record to repeatedly produce an electrical wave that corresponds to said oscillatory wave;
    simultaneously filtering the electrical wave so produced in a plurality of ways so as to produce a plurality of filtered electrical waves that respectively consist almost entirely of components that lie within different predetermined bands of frequencies;
    counting the number of wave pulses of each said filtered electrical wave that have amplitudes that lie in a predetermined peak amplitude range, the lower limit of which is greater than zero and the upper limit of which is less than the maximum amplitude of said filtered wave; and
    also counting the number of wave pulses of each said filtered wave that have amplitudes that lie in a second predetermined peak amplitude range, the lower limit of which is greater than zero and is different from the aforementioned lower limit, and the upper limit of which is less than the maximum amplitude of said filtered wave and which is different from the aforementioned upper limit.

References Cited in the file of this patent

UNITED STATES PATENTS

| | | |
|---|---|---|
| 2,629,000 | Olson | Feb. 17, 1953 |
| 2,648,822 | Walter | Aug. 11, 1953 |
| 2,673,893 | Kalfaian | Mar. 30, 1954 |
| 2,733,358 | Carapellotti | Jan. 31, 1956 |
| 2,745,985 | Lewis | May 15, 1956 |
| 2,752,589 | De Long | June 26, 1956 |
| 2,760,369 | Vanator | Aug. 28, 1956 |
| 2,774,535 | Anderson | Dec. 18, 1956 |
| 2,779,869 | Gerks | Jan. 29, 1957 |
| 2,834,883 | Lukoff | May 13, 1958 |
| 2,901,697 | Smith | Aug. 25, 1959 |
| 2,904,682 | Rawlins | Sept. 15, 1959 |
| 2,912,577 | Kelley | Nov. 10, 1959 |
| 2,958,822 | Rogers | Nov. 1, 1960 |

FOREIGN PATENTS

| | | |
|---|---|---|
| 659,862 | Great Britain | Oct. 31, 1951 |
| 1,002,499 | France | Oct. 31, 1951 |

OTHER REFERENCES

"The Cathode Ray Sound Spectroscope," Bell Laboratories Record, June 1950; pages 263–267.

"Pulse Amplitude Analysis in Nuclear Research," article in Nucleonics; September 1952; pages 32–38.

"Non Reactor Electronics at Oak Ridge" by P. R. Bell, summary of paper M.24.2, 1954; I.R.E. National Convention, New York, N.Y., Mar. 22–25, 1954.